United States Patent
Netshikhudini

(10) Patent No.: US 12,428,324 B2
(45) Date of Patent: Sep. 30, 2025

(54) WATER BALANCE IMPROVEMENT IN AN EFFLUENT TREATMENT PROCESS FOR SULPHATE REMOVAL

(71) Applicant: MINTEK, Randburg (ZA)

(72) Inventor: Tshamano Netshikhudini, Randburg (ZA)

(73) Assignee: MINTEK, Randburg (ZA)

( * ) Notice: Subject to any disclaimer, the term of this patent is extended or adjusted under 35 U.S.C. 154(b) by 756 days.

(21) Appl. No.: 17/633,800

(22) PCT Filed: Sep. 24, 2020

(86) PCT No.: PCT/ZA2020/050051
§ 371 (c)(1),
(2) Date: Feb. 8, 2022

(87) PCT Pub. No.: WO2021/062452
PCT Pub. Date: Apr. 1, 2021

(65) Prior Publication Data
US 2022/0315459 A1     Oct. 6, 2022

(30) Foreign Application Priority Data

Sep. 26, 2019    (ZA) .................................. 2019/06331

(51) Int. Cl.
| | | |
|---|---|---|
| C02F 1/52 | (2023.01) |
| B07B 13/04 | (2006.01) |
| C02F 1/66 | (2023.01) |
| C02F 101/10 | (2006.01) |
| C02F 101/20 | (2006.01) |
| C02F 103/10 | (2006.01) |

(52) U.S. Cl.
CPC .............. *C02F 1/5245* (2013.01); *C02F 1/66* (2013.01); *B07B 13/04* (2013.01); *C02F 2101/101* (2013.01); *C02F 2101/20* (2013.01); *C02F 2103/10* (2013.01)

(58) Field of Classification Search
None
See application file for complete search history.

(56) References Cited

U.S. PATENT DOCUMENTS

2019/0002311 A1*   1/2019   Kotze ................... C02F 1/5245

FOREIGN PATENT DOCUMENTS

| CZ | 2 010 265 | 10/2011 |
| WO | 2017/015679 | 1/2017 |

OTHER PUBLICATIONS

International Search Report for PCT/ZA2020/050051 mailed Jan. 27, 2021, 3 pages.
Written Opinion of the ISA for PCT/ZA2020/050051 mailed Jan. 27, 2021, 6 pages.
International Preliminary Report on Patentability for PCT/ZA2020/050051 dated Dec. 2, 2021, 6 pages.

* cited by examiner

*Primary Examiner* — Magali P Slawski
*Assistant Examiner* — Eric J McCullough
(74) *Attorney, Agent, or Firm* — NIXON & VANDERHYE

(57) ABSTRACT

A method to improve the solid/solid separation of an amorphous aluminium trihydroxide containing suspension from a gypsum containing suspension in a saturated calcium sulphate solution without the need for a dewatering step following the solid-solid separation.

2 Claims, 2 Drawing Sheets

WATER BALANCE IMPROVEMENT IN AN EFFLUENT TREATMENT PROCESS FOR SULPHATE REMOVAL

CROSS-REFERENCE TO RELATED APPLICATIONS

This application is the U.S. national phase of International Application No. PCT/ZA2020/050051 filed Sep. 24, 2020 which designated the U.S. and claims priority to ZA Patent Application No. 2019/06331 filed Sep. 26, 2019, the entire contents of each of which are hereby incorporated by reference.

BACKGROUND OF THE INVENTION

Field of the Invention

This invention relates to a method of improving the water balance in an ettringite formation or decomposition step which forms a part of a process for the removal of heavy metals, calcium and sulphate from contaminated water, typically mine waters.

Description of the Related Art

International patent application number PCT/GB98/01610 describes a process, generally referred to as "the SAVMIN process", which was developed particularly for the treatment of sulphate-containing water. This process is used to remove sulphate and calcium from effluent water with the use of amorphous aluminium trihydroxide and allows for the subsequent recovery of the latter reagent by decomposing ettringite.

The SAVMIN process is fully described in the specification of the aforementioned patent application and the content of that specification is hereby incorporated fully into this specification.

A process known as SAVMIN 2 comprises an improvement of the SAVMIN process and is described, respectively, in international patent applications numbers PCT/ZA2016/050025 and PCT/ZA2016/050026. The contents of these specifications are hereby incorporated fully into this specification.

In one stage of the SAVMIN and SAVMIN 2 processes, a calcium sulphate-containing solution (produced by preliminary steps) is combined with amorphous aluminium trihydroxide and a neutralising agent, for example hydrated lime, to promote the precipitation of ettringite which is removed from the solution, e.g. by settling, to produce a settled ettringite slurry and clear water decant.

The aluminium trihydroxide used in the abovementioned precipitation step is not available in a saleable form and must be generated, in situ, in a process that is operated in parallel to the SAVMIN and SAVMIN 2 processes.

Following precipitation of ettringite, amorphous aluminium trihydroxide is recovered by decomposing the ettringite slurry at a pH ranging from 4 to 8.5. Preferably the pH is between 8 and 8.5, The pH is lowered by adding sulphuric acid (either directly as $H_2SO_4$, or indirectly by adding $Al_2(SO_4)_3$ which hydrolyses to generate $H_2SO_4$), resulting in the formation of a saturated calcium sulphate slurry containing solids in suspension.

The solids are gypsum and amorphous aluminium trihydroxide. These solids are separated from one another, into an aluminium trihydroxide-containing suspension and a gypsum containing suspension, by means of a suitable solid-solid separation unit, for example a hydro-cyclone.

The solids are fine and, thus, to separate these solids into respective suspensions, the saturated calcium sulphate slurry must first be diluted by adding a saturated calcium-sulphate water. This forms a diluted saturated calcium sulphate slurry to which a flocculant may be added to floc the solids, thus enabling the solids to come out of suspension to allow effective implementation of the solid/solid separation technique.

The dilution step requires the sourcing of additional water which should be treated to increase the calcium sulphate content thereof to ensure it is saturated in calcium sulphate.

A settling unit is required to carry out a dewatering step following the solid-solid separation step to concentrate the recovered aluminium trihydroxide and thereby reducing its volume and thereby in turn reducing the amount of dissolved calcium sulphate that accompanies the recovered aluminium trihydroxide which would otherwise detract from the efficiency of the ettringite formation step.

The recovered concentrated amorphous aluminium trihydroxide is recycled to treat a water stream containing sulphate and calcium. This recovery step ensures that the SAVMIN and SAVMIN 2 processes are cost effective when compared to alternative processes such as ion exchange and membrane separation techniques.

There are however disadvantages associated with the implementation of both the SAVMIN and SAVMIN 2 processes. These include;

1. diluting the solids in suspension before solid/solid recovery and the subsequent dewatering thereof require sourcing of water, enhancement of the water and the use of a settler—this requires a larger plant and higher OPEX and CAPEX, ultimately making the process economically non-viable;
2. the flocculant, an expensive additive, affects the end product (amorphous aluminium trihydroxide) resulting in a product that often is not according to specification;
3. the gypsum invariably contaminates the end product. The situation is worsened if the suspension is not adequately diluted prior to the step of solid-solid separation, resulting in a drop in the solid-solid separation efficiency. The soluble proportion of the calcium sulphate contaminates the end product in the same way as solid-state gypsum does, and this effect is worsened if the recovered product is not adequately dewatered after the solid-solid separation step; and
4. the parallel process required for in situ generation of aluminium trihydroxide becomes larger if the efficiency of the ettringite formation step is reduced by greater contamination of the recycled aluminium trihydroxide with calcium sulphate as a result of inefficient solid-solid separation, which adds to the required plant size and increases OPEX and CAPEX even further.

SUMMARY OF THE INVENTION

An object of the present invention is to improve the solid/solid separation of an amorphous aluminium trihydroxide-containing suspension from a gypsum-containing suspension in a saturated calcium sulphate solution without the need for a dewatering step following the solid-solid separation.

Corresponding Figures in the two specifications relating to the SAVMIN 2 process are identical and a reference to a specific Figure or reference numeral relating to the SAVMIN 2 process under this section should be understood to refer to either of the specifications viz PCT/ZA2016/050025 and PCT/ZA2016/050026.

FIG. 4 in either specification relating to the SAVMIN 2 process illustrates the recovery of amorphous aluminium trihydroxide from the ettringite slurry 32 which is decomposed in a step 50 by adding sulphuric acid 52 to lower the pH of the slurry, thus forming a saturated calcium sulphate solution 54 including amorphous aluminium trihydroxide 62 and gypsum 60 in suspension. The amorphous aluminium trihydroxide 62 and the gypsum 60 are then separated from each other in a solid-solid separator 58.

In a step not shown in FIG. 4, prior to such solid/solid separation, the suspension 54 is diluted with water. Following the separation, flocculant is added and the separated solid-containing slurries are dewatered using settling or filtration units.

The present invention provides a method of treating a waste water stream wherein, in a first step, base and heavy metals are removed from the waste water stream to be treated by lime addition and the resulting decanted calcium sulphate-bearing stream (i.e. the equivalent of the saturated stream 22 in FIG. 2 of SAVMIN 2) is used to dilute a saturated calcium sulphate slurry containing gypsum and amorphous aluminium trihydroxide to form a diluted saturated calcium sulphate slurry, subjecting the diluted saturated sulphate-containing slurry to a solid-solid separation step, to separate the slurry into a gypsum-containing suspension and an amorphous aluminium trihydroxide-containing suspension, and directing the amorphous aluminium trihydroxide-containing suspension to an ettringite formation step.

BRIEF DESCRIPTION OF THE DRAWINGS

An example of the invention is described by way of a comparison between the accompanying flowsheets in which.

DESCRIPTION OF PREFERRED EMBODIMENT

Figure 1:
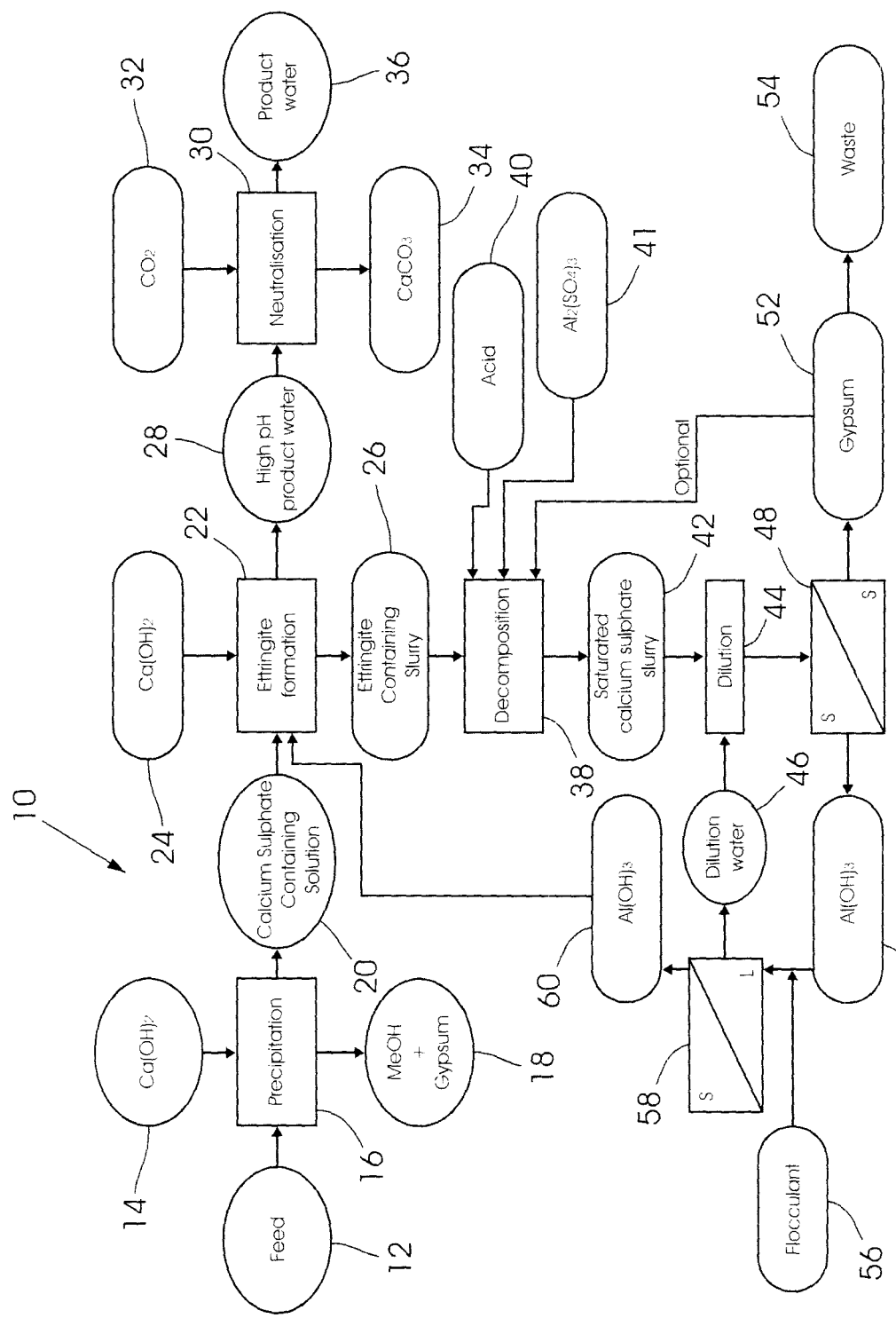
FIG. 1 is a block flow diagram relating to the SAVMIN 2 process (prior art)

FIG. 1 (prior art) illustrates aspects of an effluent treatment process 10 based on the teachings in the specifications of the SAVMIN 2 process which involves the removal of metals and sulphate at ambient conditions from contaminated mine waters.

Waste water 12, typically acidic mine water, is contacted with an alkali 14, such as hydrated lime ($Ca(OH)_2$), in a precipitation step 16 to precipitate solids 18, comprising of gypsum and other impurities including heavy metal hydroxides, thereby producing a saturated calcium sulphate solution 20.

In a step 22 amorphous aluminium trihydroxide (introduced via stream 60) and lime 24 are added to the saturated calcium sulphate solution 20 decanted from the solids 18. The step 22 produces an ettringite-containing slurry 26, and a high pH product water 28 which is neutralised in a carbonation step 30, by adding carbon dioxide 32, to produce calcium carbonate 34 and a neutralised product water 36.

In a decomposition step 38, acid ($H_2SO_4$) 40 and aluminium sulphate ($Al_2(SO_4)_3$) 41 (the latter to replenish losses of aluminium) are added to the ettringite-containing slurry 26 to form a saturated calcium sulphate-containing slurry 42 in which amorphous aluminium trihydroxide and gypsum are suspended.

The slurry 42 is diluted in a dilution step 44 by the addition of water 46 prior to carrying out a solid-solid separation step 48 to separate an aluminium trihydroxide-containing suspension 50 and a gypsum-containing suspension 52 which is directed to waste 54 or, optionally, a part thereof, is directed to the decomposition step 38.

The dilution water 46, (the first fill of which is prepared in a parallel process in which water is saturated with calcium sulphate) is recovered from a solid-liquid separation step in which the water content in the aluminium trihydroxide suspenstion 50 is decanted and returned to the dilution water stream 46. The dilution water 46 is thus in a circuit which comprises the dilution step 44, the solid-solid separation step 48, which produces the dilute aluminium trihydroxide containing suspension 50, and a solid-liquid separation step 58 whereby the dilution water 46 is recovered and a concentrated aluminium trihydroxide containing suspension 60 is formed Without the solid-liquid separation step 58, the calcium sulphate content of the dilution water 46 would report to the ettringite formation step 22 with the aluminium trihydroxide suspension 50, adding to the sulphate load in the ettringite formation step 22 and interfering with the availability of the aluminium trihydroxide (added via the suspension 50) for ettringite formation, from the saturated calcium sulphate solution 20, instead it would form ettringite from the calcium sulphate in the suspension 50. Therefore, the more dilute the recycled aluminium trihydroxide suspension 50 is, the larger is the required volume of aluminium hydroxide that must be recycled to the ettringite formation step 22 to provide a sufficient quantity of aluminium hydroxide to immobilise the combined sulphate content of the saturated calcium sulphate solution 20 and the recycled aluminium trihydroxide 50 as ettringite.

The aforementioned problem is avoided by subjecting the aluminium trihydroxide suspension 50 to the dewatering step, i.e. to the solid/liquid separation 58 to produce the concentrated aluminium trihydroxide stream 60, and the dilution water 46 which is decanted and recycled to the dilution step 44. The dewatering step 58 requires the use of an expensive flocculant 56, which accumulates in the process and could possibly interfere with the chemical reactivity of the aluminium trihydroxide in the recycled suspension 60.

Figure 2:
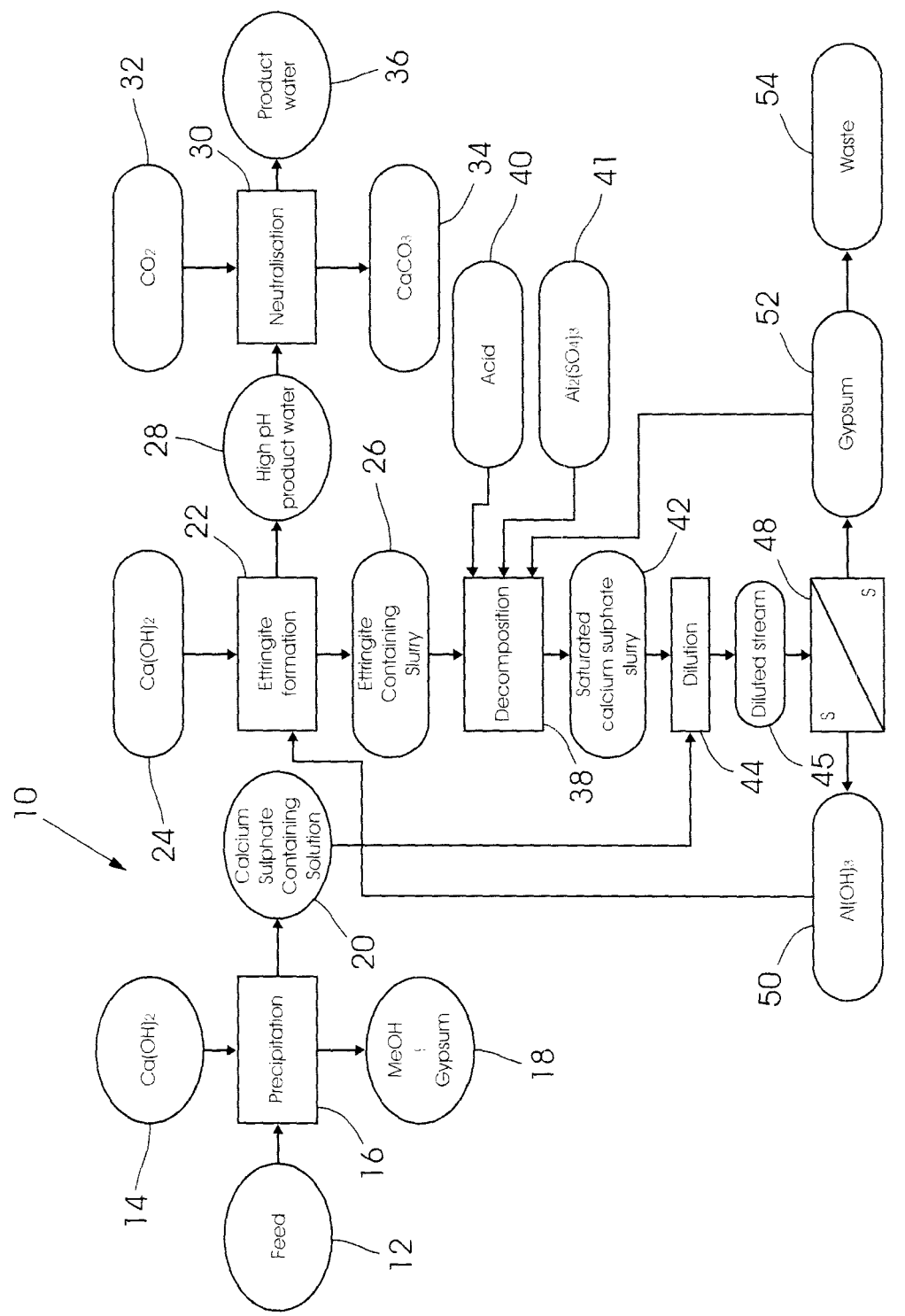
FIG. 2 is a block flow diagram illustrating the present invention which implements improvements to the SAVMIN and SAVMIN 2 processes.

FIG. 2 depicts the modifications made to the flow sheet in FIG. 1, in accordance with the present invention. A significant benefit arises from the step of using the saturated calcium sulphate solution 20 to dilute the saturated calcium sulphate-containing suspension 42 in a dilution step 44.

As in the FIG. 1 flow sheet, the diluted saturated calcium sulphate containing slurry 45 is subjected to the solid/solid separation step 48 to produce a gypsum-containing suspension 52 and an aluminium trihydroxide-containing suspension 50. The solid/solid separation step 48 is mainly achieved by means of size exclusion.

A portion of the gypsum containing suspension 52 is sent to the ettringite decomposition step 38 for seeding. The remaining portion of the gypsum containing suspension 52 is removed from the system as a by-product or waste 54.

The aluminium trihydroxide suspension 50 and the entrained dilution water 20 are recycled to the ettringite formation step 22. No dewatering of stream 50 is required as the use of the saturated calcium sulphate containing solution 20 as dilution water (in the step 44) establishes a favourable water balance in the ettringite formation step 22 since in the present invention only stream 50 reports to the ettringite formation step 22, as opposed to the case in the prior art where both streams 20 and stream 60 (derived from stream 50) would report to the ettringite formation step 22.

The overall water balance of the amorphous aluminium trihydroxide recovery in the process is thus improved. The use of the saturated calcium sulphate solution 20 (for dilution) negates the need to produce the saturated calcium sulphate-containing water 46 and the addition thereof to the slurry 42. As per FIG. 2, thus, dispensing with the need for a settler to dewater (step 58) the diluted amorphous aluminium trihydroxide suspension 50, to produce the concentrated suspension 60. The need to use a flocculant is also eliminated. This leads to a reduction in plant size and reagent costs, significantly lowering the CAPEX and the OPEX of the process.

The successful solid-solid separation 48 of the amorphous aluminium trihydroxide stream 50 from the gypsum-containing suspension 52 is possible due to the difference in the particle sizes of the gypsum and of the amorphous aluminium trihydroxide. The separation is enhanced by increasing the difference between the particle sizes of the gypsum and of the amorphous aluminium trihydroxide. This is achieved by growing the gypsum particles/crystals by means of seeding i.e. as described, by recycling a portion of the suspension 52 to the decomposition step 38 to form larger gypsum particles/crystals. Amorphous aluminium trihydroxide does not readily crystallise nor grow in particle size.

The aluminium trihydroxide is generated within the process and there is no need to generate this as a reagent by operating a parallel process.

The invention claimed is:

1. A method of improving water balance in a process for treating a waste water stream (12) comprising a sulphate solution, which method includes the steps of:
   (a) contacting the water stream (12) with hydrated lime (14) to precipitate solids (18) therefrom and to produce a saturated calcium sulphate-containing solution (20),
   (b) producing an ettringite-containing slurry (26) by adding lime (24) to an amorphous aluminium trihydroxide-containing suspension (50) and an entrained calcium sulphate solution (20),
   (c) adding acid (40) and aluminium sulphate (41) to the ettringite-containing slurry (26) to form a saturated calcium sulphate-containing slurry (42) in which amorphous aluminium trihydroxide and gypsum are suspended,
   (d) producing a diluted saturated calcium sulphate-containing slurry (45) by using the saturated calcium sulphate-containing solution (20) to dilute the saturated calcium sulphate-containing slurry (42), and
   (e) subjecting the diluted saturated calcium sulphate-containing slurry (45) to a solid-solid separation step to produce said amorphous aluminium trihydroxide-containing suspension (50) and the entrained saturated calcium sulphate solution (20), for use in step (b);
   wherein said method is performed without a dewatering step of the amorphous aluminum trihydroxide-containing suspension following the solid-solid separation step.

2. The method according to claim 1, wherein the solid-solid separation step is enhanced by growing gypsum particles by seeding.

* * * * *